(12) United States Patent
Siewert et al.

(10) Patent No.: US 8,473,779 B2
(45) Date of Patent: Jun. 25, 2013

(54) SYSTEMS AND METHODS FOR ERROR CORRECTION AND DETECTION, ISOLATION, AND RECOVERY OF FAULTS IN A FAIL-IN-PLACE STORAGE ARRAY

(75) Inventors: Samuel Burk Siewert, Erie, CO (US); Phillip Clark, Boulder, CO (US); Lars E. Boehnke, Firestone, CO (US)

(73) Assignee: Assurance Software and Hardware Solutions, LLC, Louisville, CO (US)

( * ) Notice: Subject to any disclaimer, the term of this patent is extended or adjusted under 35 U.S.C. 154(b) by 129 days.

(21) Appl. No.: 12/395,529

(22) Filed: Feb. 27, 2009

(65) Prior Publication Data
US 2010/0077252 A1 Mar. 25, 2010

Related U.S. Application Data

(60) Provisional application No. 61/032,878, filed on Feb. 29, 2008.

(51) Int. Cl.
*G06F 11/00* (2006.01)
(52) U.S. Cl.
USPC .............. 714/6.23; 714/40; 714/43; 714/48; 714/25; 711/118
(58) Field of Classification Search
USPC .. 714/40, 43, 48, 704, 25, 6.23, 6.3; 711/118; 709/213
See application file for complete search history.

(56) References Cited

U.S. PATENT DOCUMENTS

| | | | | |
|---|---|---|---|---|
| 6,795,934 B2 * | 9/2004 | Nagata et al. | ................... | 714/5.1 |
| 7,681,071 B2 * | 3/2010 | Kikuchi | ....................... | 714/6.12 |
| 7,701,700 B2 | 4/2010 | Hall et al. | | |
| 7,809,888 B1 * | 10/2010 | Clark et al. | .................... | 711/118 |
| 2005/0120025 A1 * | 6/2005 | Rodriguez et al. | .............. | 707/10 |
| 2005/0144383 A1 * | 6/2005 | Higaki et al. | ................. | 711/114 |
| 2005/0185374 A1 * | 8/2005 | Wendel et al. | ................ | 361/685 |
| 2005/0223266 A1 * | 10/2005 | Iwamitsu et al. | ................. | 714/5 |
| 2005/0278581 A1 * | 12/2005 | Jiang et al. | ....................... | 714/40 |
| 2006/0248359 A1 * | 11/2006 | Fung | ............................. | 713/300 |
| 2007/0030640 A1 * | 2/2007 | Hall et al. | ..................... | 361/685 |
| 2007/0035873 A1 * | 2/2007 | Hall et al. | ................... | 360/97.02 |
| 2010/0077252 A1 * | 3/2010 | Siewert et al. | ..................... | 714/6 |

OTHER PUBLICATIONS

Hamilton, "An Architecture for Modular Data Centers", Jan. 10, 2007, Microsoft, p. 1-9 8.*
Rao, "Reliability for Networked Storage Nodes", 2006, IBM, p. 1-10.*

(Continued)

*Primary Examiner* — Joshua P Lottich
*Assistant Examiner* — Jeison C Arcos
(74) *Attorney, Agent, or Firm* — Patent Innovations LLC; John M. Hammond

(57) ABSTRACT

Systems and methods for recovering from a fault in an array of data storage devices are provided. Fault recovery includes determining that a first data storage device of the array of data storage devices is more likely to fail that other storage devices of the array of data storage devices. A second data storage device in the array of data storage devices is selected to be used in recovering from a failure of the first data storage device. Data from the first data storage device is stored at the second storage device. In the event of a failure at the first data storage device, data storage operations are performed using the second storage device.

16 Claims, 8 Drawing Sheets

OTHER PUBLICATIONS

Rivest, "The MD5 Message Digest Algorithm" Apr. 1992, MIT, p. 1-22.*
Dell, "Dell OpenManage Server Administrator Storage Management User's Guide", 2006, Dell, p. 1-23.*
Morrey, "Content-Based Block Caching", Mar. 2006, University of Colorado, p. 1-13.*
Vuong, "ARC: An Approach to FLexible and Robust RAID systems", May 16, 2008 University of Wisconsin-Madison, p. 1-10.*
Hughes, "Reliability and Security of RAID Storage System and D2D Archives Using SATA Disk Drives", Dec. 2004, University of California San Diego, p. 1-13.*

* cited by examiner

SYSTEMS AND METHODS FOR ERROR CORRECTION AND DETECTION, ISOLATION, AND RECOVERY OF FAULTS IN A FAIL-IN-PLACE STORAGE ARRAY

CROSS REFERENCE TO RELATED APPLICATIONS

This application claims the priority of U.S. provisional patent application No. 61/032,878, entitled "Systems and Methods for Detection, Isolation, and Recovery of Faults in a Fail-in-Place Storage Array," and filed on Feb. 29, 2008, the entire disclosure of which is incorporated herein by reference.

FIELD

The present invention is directed to fault handling in a data storage system, and, more specifically, to detection of faults, isolation of faults, and recovery from faults in an a fail-in-place array of storage devices.

BACKGROUND

Data storage is accomplished in a variety of well known manners and is well established. One aspect of data storage is the backup of stored data such that, in the event of a fault or failure of a data storage device, the stored data will still be available to an entity that desires to access the data. Backups are well known, and take many forms. From the perspective of an entity that desires to access data, any time the is not readily available, the data is considered to be not available. For example, data may be stored on a data storage device that is readily accessible by a user, and backed up on a separate backup system that is not readily accessible by the user. In the event of a failure of the data storage device, the user is often not able to access the data until the data is restored from the backup system. In data storage, the amount of time that the data is not available to a user that desires to access the data is considered as time that the data is not available. Thus, availability of data commonly used as a metric for storage systems, with more highly available data being desirable.

Numerous data storage and backup systems are known, which provide data with relatively high availability. For example, data is commonly stored in arrays of data storage devices, where stored data is distributed across several devices in the array. One example is RAID storage, that provides a data storage array and distributes data to devices in the array in a manner that, in the event of a failure of a device in an array, data will continue to be available to a user that desires to access the data. Availability of data in some systems may be enhanced through, for example, mirroring of data and data snapshots, and in the event of a failure other copies of data may be provided. Restoring a system after a failure may involve rebuilding the data of the failed storage device to a different storage device or restoring data of the failed storage device to a different storage device.

SUMMARY

Embodiments disclosed herein address the above stated needs by providing systems, methods, and apparatuses that enable storage, error detection, and fault recovery for data storage arrays.

In one aspect, provided is a method for recovering from a fault in an array of data storage devices, comprising (a) determining that a first data storage device of the array of data storage devices is more likely to fail that other storage devices of the array of data storage devices; (b) selecting at least a second data storage device in the array of data storage devices to be used in recovering from a failure of the first data storage device; (c) storing data from the first data storage device at the second storage device; and (d) in the event of a failure at the first data storage device, continuing data storage operations at the array of data storage devices using the second storage device.

Another aspect of the present disclosure provides a method for detecting errors in data stored at an array of data storage devices, comprising: (a) receiving data to be stored at an array of data storage devices; (b) performing a digest on said received data; (c) storing said data and said digest at said array of data storage devices; (d) reading said data and said digest from said array of data storage devices; (e) performing a digest on said read data; (f) comparing said digest of said read data to said stored digest; and (g) determining that there is an error when said comparing indicates a difference in said digests.

BRIEF DESCRIPTION OF THE DRAWINGS

Various embodiments, including a currently preferred embodiment and the currently known best mode for carrying out the invention, are illustrated in the drawing figures, in which.

DETAILED DESCRIPTION

Figure 1:
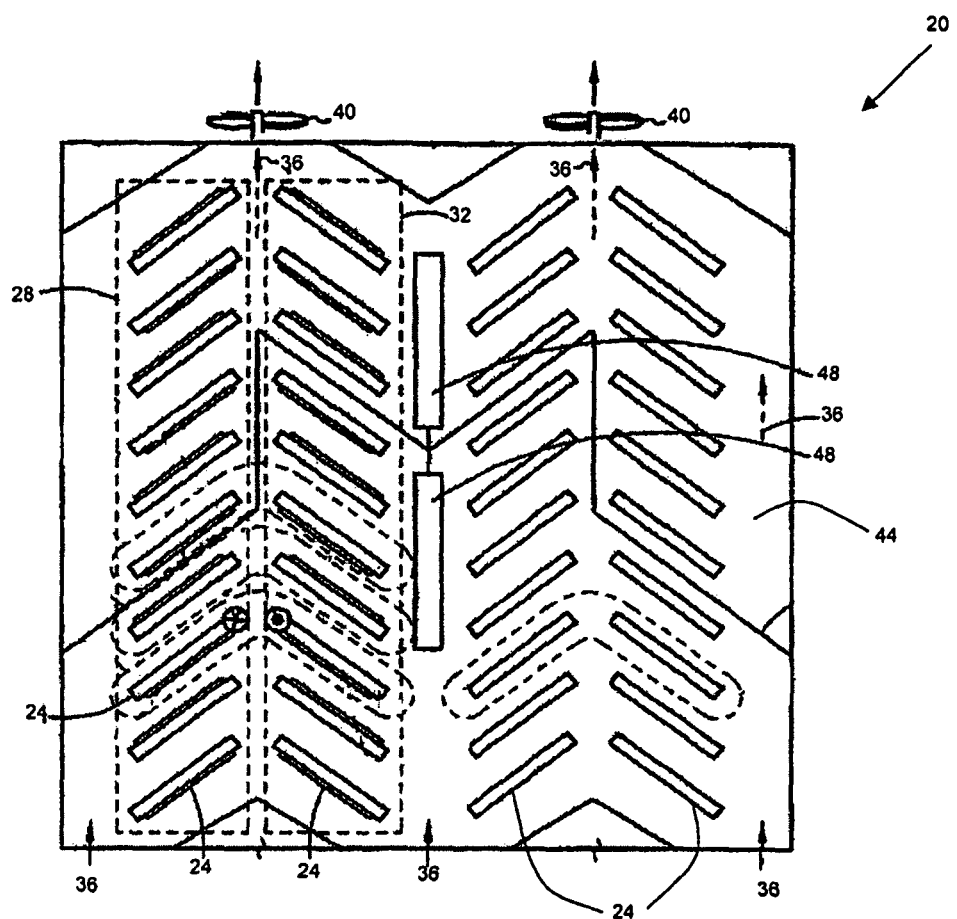
FIG. 1 is an illustration of an enclosure of an exemplary embodiment having a plurality of data storage devices therein.

With reference now to the drawing figures, various exemplary embodiments of the present disclosure are now described. FIG. 1 illustrates an enclosure 20 of an exemplary embodiment of the present disclosure. In this embodiment, the enclosure 20 includes a plurality of disk drives 24 that are arranged in a herringbone type pattern with a first set of drives 28 arranged in a first orientation relative to the enclosure 20, and a second set of drives 32 arranged in a second orientation relative to the enclosure. The herringbone type pattern of the drives 24 provides for enhanced air-flow around the individual drives 24. In the illustration of FIG. 1, air flow 36 is generated by fans 40 that are coupled to the enclosure 20. The disk drives 24 are interconnected to a backplane 44, such as a printed circuit board, and are interconnected to control circuitry 48 and a power supply (not shown) through the backplane 44. The enclosure 20, in this embodiment, is a sealed enclosure containing a number of disk drives 24 that may store data and provide stored data to users or other systems through any known data transfer mechanisms. As mentioned, the enclosure 20 is sealed in this embodiment, meaning that in the event of a failure of a disk drive, the failed drive remains in the enclosure 20. Data is stored on the disk drives 24 in such a manner to allow for data from a failed drive to be recovered or restored using other drives 24 within the enclosure 20. For example, in various embodiments data is stored on the disk drives 24 using RAID storage techniques and/or mirroring techniques.

In an exemplary embodiment, the enclosure 20 and associated disk drives 24 are referred to as a Single Array of Identical Disks (SAID), and is designed to require minimal-maintenance over a three year lifetime of continuous storage operations. Minimal maintenance of the system may be required for software upgrades, replacement at end of life, occasional monitoring of the system fitness, and replacement of fans and filters, for example. However, in the event of a failure of a data storage device such as disk drive 24, no maintenance is required. Furthermore, redundant components that enable operations of the data storage devices are provided such that, in the event of a failure of such a component, maintenance is not required. The "sealed" resources of enclosure 20 of this embodiment include hardware and firmware inside the enclosure, excluding the externally accessible fans and filters.

In one exemplary embodiment, data storage devices such as hard disk drives are employed that are assumed to have a mean-time-between-failure (MTBF) (based on manufacturer data) of 500,000 hours with a 24 hour per day, 7 day per week, 100% duty cycle, and a MTBF of 300,000 hours at a 35% duty cycle (3000 hours per year). In this embodiment, the data storage devices are operated through a virtualization engine that monitors and controls duty cycle for RAID-10 mappings that mirror data, and therefore, in such an embodiment, reduce duty cycle significantly (50% or less). The enclosure of this embodiment is designed with identical sealed disks that may be recovered automatically with relative ease in the event of a failure of a particular disk. Furthermore, the enclosure is provided with active spare disk drives so that recovery from a failure may be accomplished in relatively short order while maintaining nameplate storage capacity. Internally the enclosure of such an embodiment may include redundancy and automatic failover on all components in the sealed enclosure. In one embodiment, illustrated in FIG. 2, an enclosure includes the following sealed components: 192 hard drives with 24 spare hard drives that are assumed to have 200,000 hour MTBF at 35% duty cycle. Other embodiments may include different numbers of hard drives, as will be readily recognized by one of skill in the art. Duty cycle of the hard drives is controlled to 50% or less for mirroring, and 33% for embodiments utilizing data storage employing Plex-4/3 data storage. As will be understood, Plex 4/3 is a data storage scheme that provides RAID storage and mirroring of stored data. A Plex 4/3 mapping may cover double drive faults such as a second drive failure in a RAID set during a rebuild of the RAID set from a first drive fault. In various embodiments, recovery from a failure may be accomplished with automatic mirror rebuild of the data associated with the failed device, and may include predictive rebuilds, rebuild-at-rate, fast-rebuild, or opportunistic-rebuild rates. The enclosure provides power to internal components using internal power supplies that are provided with excess capacity and load sharing, and in one embodiment 2 out of every of 3 DC/DC converters may fail. The enclosure includes control electronics that include microcontroller redundancy and cross-strapping, and SAS wide port from controller to drives with 4× capacity. Such a configuration also improves performance absent a failure of any associated control electronics.

In an embodiment, up to a triple fault in SAS controllers may be recovered using virtualization techniques. Outside of the sealed enclosure, in various embodiments, some minimal maintenance is required for: (1) fan replacement, although an enclosure may be over-cooled with excess airflow capacity, making such a failure non-critical; (2) filter replacement at a frequency that is dependent upon the deployment environment; (3) Controller and firmware upgrades, such as for performance/feature enhancements and/or any serious bugs that may be discovered. Such a software upgrade may be done with images that are complete and include all firmware and controller software images in totality. When such an image is delivered to a user of the enclosure, the entire image may be uploaded via the management interface, the upgrading controller taken off line (redundant controller configuration assumed). Such an upgrade may be accomplished with firmware in place, thus providing an upgrade to be completed with minimal or no service interruption. In the unlikely event that a drive firmware requires upgrade service may be interrupted.

Figure 2:
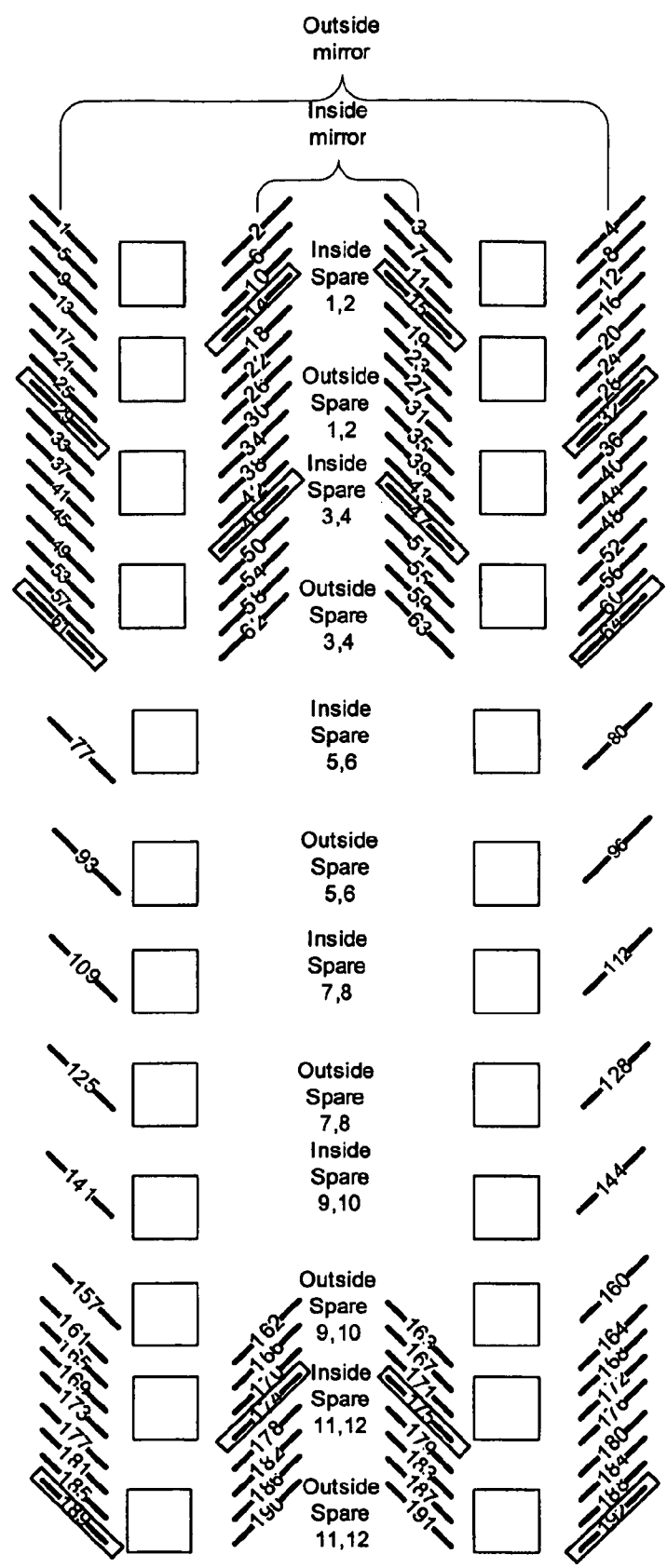
FIG. 2 is an illustration of a configuration of a plurality of data storage devices of an embodiment.

As mentioned, the enclosure of the exemplary embodiment of FIG. 2 is designed to provide that a disk failure is not followed by a replacement of the failed disk. This may be referred to as "fail-in-place," of FIP. In order to provide an enclosure with adequate spare capacity to account for expected disk failures, expected disk drive failure rates are assumed, such as the above described hard drive MTBF. As will be understood, a relatively small number of drives are expected to fail uniformly during the normal lifetime of an enclosure, with an increasing frequency of failure as the enclosure approaches the end of life. In the embodiment described above, a population of 192 drives, using the above MTBF numbers, results in 24 drives that would be expected to fail during a 3 year lifetime, with most failing after 3 years. Any departure from expectation would indicate early end of life behavior and, in an embodiment, is reported to a user so as to alert the user and increase the likelihood of replacement of the enclosure before loss of service or data occurs.

As noted, the enclosure of various embodiments employs fail-in-place techniques, and in an embodiment provides automatic recovery from failures through RAID-10 VLUN data storage. In such an embodiment, all VLUNs include at least RAID-1 or RAID-10 mirrored data thereby reduce the duty cycle to 50% or less, allowing data on failed drives to be recovered and mirrors rebuilt automatically to maintain fault protection. In one embodiment, spares are maintained at a 35% to 20% duty cycle, and employ predictive re-build in progress at all times for the 24 most likely to fail drives in the array. Such predictive rebuild will be described in more detail below. In such embodiments, the system predicts the drives that are most likely to fail and rebuilds these drives prior to the drive failing. In the event that one of the predicted drives fails, the data stored at the drive has already been rebuilt and there is no loss of data or performance from the system as a result of the failure. In the event that the prediction is incorrect, and a failure occurs in a drive other than the identified drives that are more likely to fail, no performance is lost compared to a scenario where no predictive rebuilding is performed. Such an embodiment provides spare disk drives that are kept active and at similar but lower wear levels than the operational drives.

Various scenarios are provided. One such scenario, as mentioned, is a predictive rebuild, in which the time to bring last predicted rebuild up to date with delta since last predictive snapshot is relatively short, such as minutes or less. A fast rebuild may be performed, in which the rebuild may be disruptive to input/output operations (IOPS) for the enclosure. In one embodiment, the fastest rebuild time is 32-64 Mbytes/sec which corresponds to 10-30 minutes for 40 Gbyte drives. Rebuild may be performed at non-disruptive rates, which may take longer than a fast rebuild. For example, if an 8 Mbyte/sec stream of data is desired to be provided to/from the enclosure, a 24 Mbyte/sec rebuild stream may be accommodated while maintaining the desired IOPS. Such a rebuild would take 30 minutes for a 40 Gbyte drive. Such a rebuild will temporarily increase duty cycle from rebuild sources, but this will be a minimal impact over the lifetime. Finally, opportunistic rebuild may be employed. Opportunistic rebuilds are performed on read during IOPS, and may be relatively slow, although relatively non-disruptive to IOPS for the enclosure.

Figure 3:
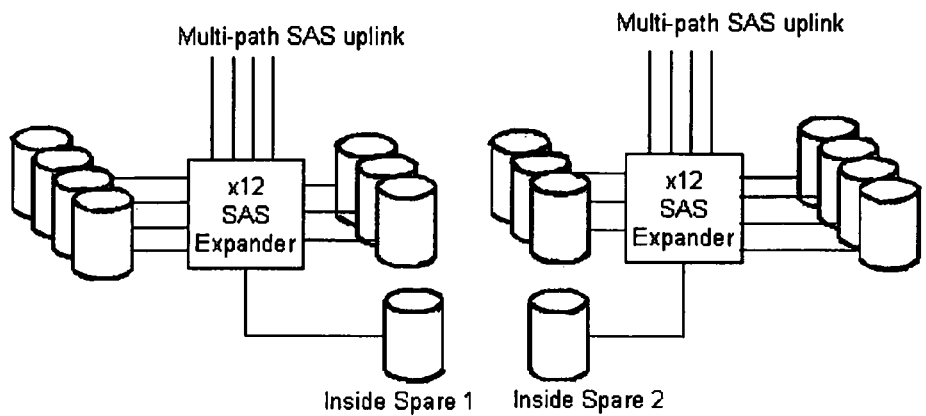
FIGS. 3 and 4 are block diagram illustrations of expanders, active drives, and spare drives of an embodiment.
Figure 4:
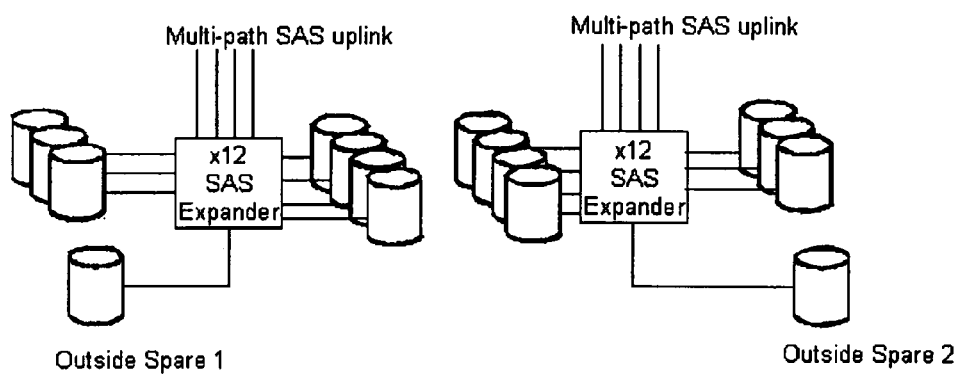
Figure 5:
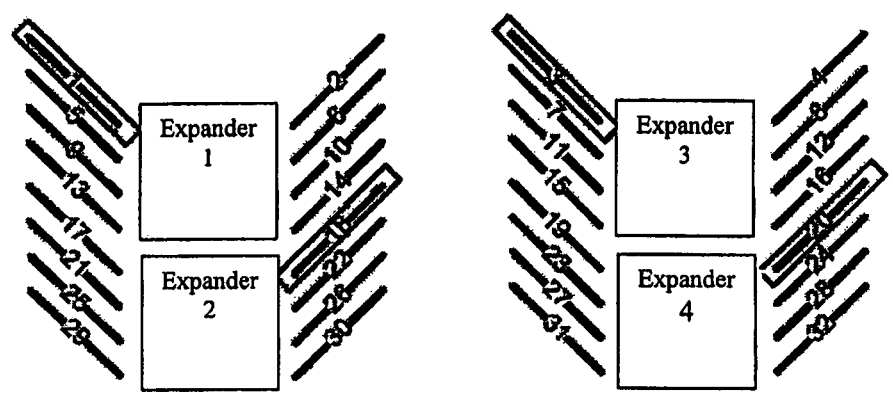
FIG. 5 is a block diagram illustration of expanders, active drives in an array of drives, and spare drives of an embodiment.

Referring again to FIG. 2, an enclosure of this embodiment includes drives that are configured in a RAID-1 configuration and provide sparing. The system of such an embodiment may be configured during manufacturing such that when powered on, it will present one VLUN for each enclosure that virtualizes all drives in the array, and provides RAID-1 (mirror pairs for all reads and writes). Upon delivery, such a system is ready for file system build and content loading. Spare drives may be organized so that in the full 192 drive configuration there are 24 spare drives, and 168 active drives. The enclosure includes controllers, also referred to as expanders, with 1 spare drive per expander. In another exemplary embodiment, the enclosure is 27" and occupies three standard rack units (RUs). The spare drives are illustrated in FIG. 2 as drives 14, 15, 29, 32, 46, 47, 61, 64, 174, 175, 189, and 192. Such a distribution of spare drives provides that that in the unlikely event of an expander failure, a minimum number of spares are lost (only one per mirror pair or Plex-4/3 set). As will be appreciated, having a relatively large number of drives is a relatively small area can produce a significant amount of rotational vibration in an enclosure, due to actuator activity within the disk drives. Arrangement of the drives in a herringbone type pattern helps reduce the effects of rotational vibration. Furthermore, including spare drives as illustrated in FIG. 2 also helps reduce the rotational vibration. Such a spare drive placement allows for the rebuild of mirrored pairs using a spare drive from the same inside or outside set based upon whether the failed drive is from an inside or outside mirror pair. The sparing strategy minimizes rotational vibration by ensuring that the actuator motion is off plane for all mirrored pairs as spares are brought in for recovery. If an outside pair drive fails and there are no more outside spares available, then the inside spare that is furthest from the failure is used so that rotational vibration is once again reduced. The spare drive will be in the same plane as the failed drive, but will be located a relatively long distance from the original pair member that is still functional. FIGS. 3 and 4 illustrate active drives, spare drives, and an associated expander for inside spare drives (FIG. 3) and outside spare drives (FIG. 4). In one embodiment, illustrated in FIG. 5, drives in RAID sets are interlaced through associated expanders, thereby providing that mirror pairs span two expanders and that Plex-4/3 sets span 4 or more expanders (more for extensions of Plex-4/3 to Weaver codes and Plex-n/m). In such a manner, in the event of a failure of an expander, drives associated with a mirror pair continue to be on different expanders due to the inclusion of redundant expanders for particular sets of drives.

At the end of life for the enclosure, data may be transferred form the enclosure to another enclosure or to another storage system prior to a failure of the enclosure. In one embodiment, a replacement enclosure is provided and a management interface provides for transition of data to the replacement enclosure. For example, a replacement SAID can be brought on site and data mirrored from the operational SAID to the replacement SAID at a non-disruptive SAID duplication streaming rate. In such a manner, an enclosure may be swapped out prior to a failure that is not recoverable. For example, in the event that 12 drives of the enclosure have failed, the enclosure will not have any remaining spare drives. If another drive were to fail in such a situation, the RAID set associated with the failed drive will be operating with a mirror set in critical mode. In such a situation, a management interface may be provided with a warning that the enclosure should be replaced.

In one embodiment, the disk drives associated with the enclosure provide operational data that relate to the operation of the particular disk drive. For example, disk drives may include Self-Monitoring, Analysis, and Reporting Technology, (SMART), that provides information on various indicators of reliability for the disk drive. Such indicators may provide an indication that a drive may in the relative near future experience a predictable failure. For example, in disk drives, mechanical failures, which are usually predictable failures, account for about 60 percent of drive failures. SMART information may provide a warning of impending drive failure while time remains to take preventative action, such as rebuilding of data stored on the noted disk drive. For example, if SMART information for a particular drive shows that the drive experienced a first scan error, this may indicate that the drive is more likely to fail within 60 days than drives with no such errors. Similarly, SMART information indicating first errors in reallocations, offline reallocations, and probational counts may also indicate that the associated drive is more likely to fail in the near future than drives with no such errors. In one embodiment, such operational data is monitored, and in the event that it is determined that a drive is more likely than other drives to have a failure, the data on the associated drive is rebuilt as another mirror for the particular drive on an available spare drive. In the event that the drive does actually fail, failover to the replacement drive takes a relatively short period of time, because at least a significant portion of the data from the failed drive has already been rebuilt. In the event that the drive does not fail, the additional mirror of the data may be used in IO operations, and thereby provide enhanced performance. If a different drive fails, rebuild is performed according to methods as will be discussed in more detail below. In any event, there is no penalty for an incorrect prediction that a drive may fail, and IO performance is enhanced from the availability of data on additional drives.

In another embodiment, SCSI Enclosure Services (SES) data may be monitored to determine status of various components of the enclosure. Such data may be used to monitor, for example, board temperatures for floorboards in the enclosure, expander temperatures, SAS domain expander health, and status from x36 SEP processor I2C interfaces. Such monitoring may be used to note any departure from the expected maintenance-free lifetime for the enclosure. Such deviations, while not expected, may allow for replacement of an enclosure without data loss or service interruption.

As described, an enclosure of various embodiments is provided that may be expected to have a maintenance-free lifetime, based upon probability of drive failure, of 3 years. To provide some additional detail, an exemplary embodiment provides a disclosure with a 192 disk population. Operational hours for 3 years for such an enclosure is 4,415,040 hours (168 active drives×365×24×3). Each drive experiences a maximum duty cycle of 50% for simple mirroring and for 24/7 operation, and a maximum of 4380 hours of operation. If the manufacturer provides an MTBF of 300,000 hours, and a drive experiences 3000 hours pf operation per year in a Plex-4/3 configuration, the enclosure can be expected to provide three years of life without replacement. Namely, a 33% duty cycle would result in 2920 hours per year. Assuming uniform failure rates based upon a 185,000 hours MTBF per drive, the expected number of failures would be 24 from ceiling of (4,415,040/185,000). An alternative model is to assume that MTBF is a distribution around an expected MTBF of 280,000 hours (approximately half of manufacturer MTBF) with a 3-sigma standard deviation of 56,000 hours based upon typical Annual Return Rates of 2%. This provides best case, expected, and worst case sparing which is 12 for best case, 24 for worst case with an expectation of 18 failed drives with 99.9999% confidence on this uniform interval.

Drive MTBF is an important factor lifetime limits for a fail-in-place data storage system. Online spares can rebuild mirrored data in 640 seconds in the best case, assuming full capacity of the drive is being used for a 40 Gbyte drive. Different drive loads will, of course, provide different upper bounds on minimum rebuild time. This minimum time that the drive is cloned results in the drive being essentially out of service during this time, and results in a reduced Quality-of-Service (QoS). While such a practice will minimize rebuild time, it is unacceptable for many applications, such as video-on-demand (VoD). To avoid QoS interference that may be associated with an immediate rebuild, two other rebuild modes are provided in an exemplary embodiment. As discussed above, a predictive rebuild may be provided. Such a practice may provide reduced rebuild times in the event of a correct prediction of most likely to fail drives, and also provide wear leveling control between disk drives. In the event that a drive failure was not predicted, on in embodiments that do not utilize predictive rebuilding, a rate-matching (N:1) rebuild may be provided. In such a case, rebuild I/Os are interleaved periodically with operational I/Os. In another embodiment, a best effort rebuild may be provided that employs rebuild on read. Such a rebuild would be slow and non-deterministic, but very non-disruptive. Best effort rebuilding has the least impact on current in-service performance, but also significantly increases exposure time to double faults during the rebuild. With best effort, the rebuild I/Os are captured from the read stream (rebuild on read) and occasionally inserted in the queue. In one embodiment, predictive rebuilding is employed, and in the event that a failure is not predicted, rate-matching (N:1) rebuild is performed whereby rebuild I/Os are inserted into queues at a rate of one rebuild I/O per N service I/Os. So, for example, with 10:1 rate-matching rebuild, the rebuild time would be 6400 seconds (about 1 hour and 45 minutes). If the enclosure is used, for example, in a VoD application, VoD latency requirements are typically 250 msecs for each 256K I/O block transfer. If typical latencies provided by the enclosure are 30 msecs average, a more aggressive rebuild rate-matching could be used. If a 1:1 rate matching were used, rebuild time would be 1280 seconds (about 21 minutes and 20 seconds). For a 2:1 rebuild rate the rebuild I/O blocks would be divided into 128K rebuild blocks and distributed between two VoD 256K blocks. This algorithm of dividing and inserting to minimize latency impact is followed to minimum rebuild block size of 4K. So, in such an embodiment, the mean time to recovery (MTTR) would range from 640 seconds to 1280 seconds in a typical VoD deployment.

Figure 6:
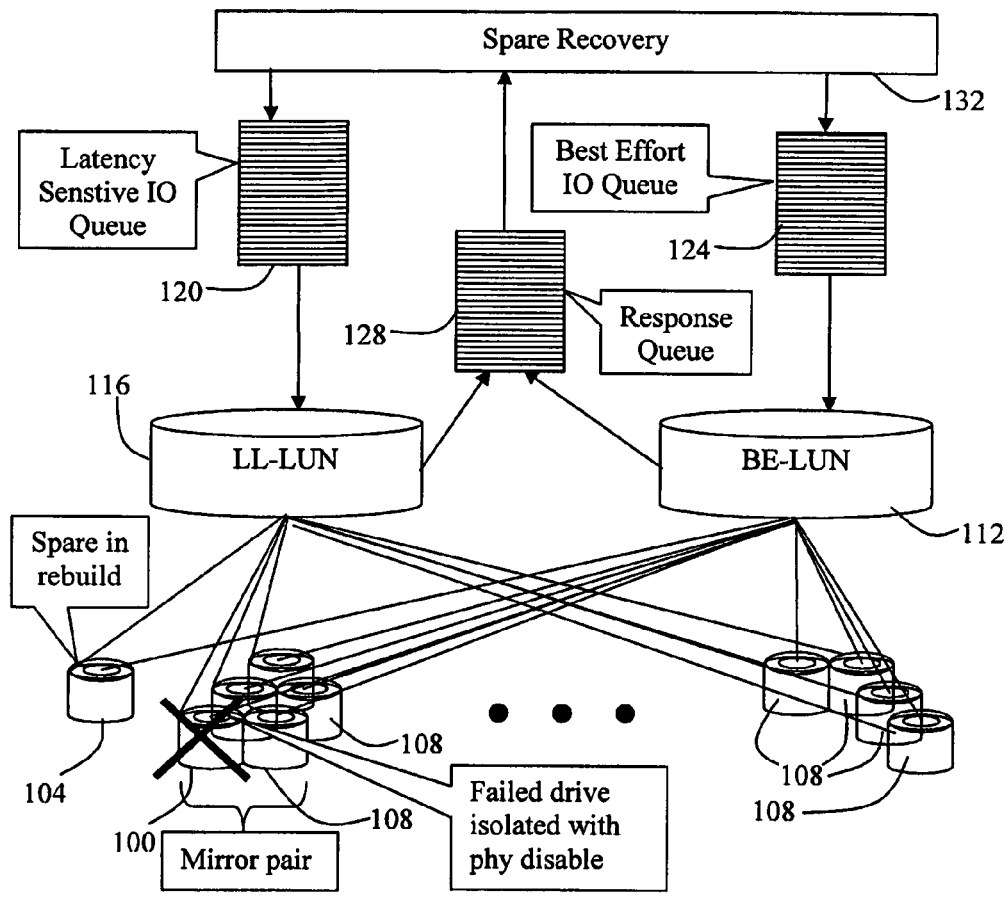
FIG. 6 is a block diagram illustration of a system for recovering from a drive failure for an embodiment.

In one embodiment, illustrated in FIG. 6, a hybrid of best effort rebuilding and rate-matching rebuilding is utilized. In this embodiment, a failed drive 100 is rebuilt onto a spare drive 104. In this embodiment, at least a portion of the drives 108 include different zones of storage. The different zones correspond to latency time to provide data from the disk drive, with a low-latency zones used to store data that is desired to be provided with low latency, and higher latency zones used to store data that is not required to be provided with low response times. Such zones may correspond to different areas within a disk drive, as data stored at inner portions of a disk in a disk drive has higher latency then data stored at outer portions of the disk. This difference in latency results from reduced seeking required for outer portions of the disk compared to latency resulting from reading data from inner portions of the disk. In an embodiment, data requiring higher QoS are preferably stored in lower latency zones. Data that is not required to be provided in a highly time sensitive manner, referred to as "best efforts" data, is stored at the inner portions of the disk drives 108. LUNs associated with best efforts data are referred to best-effort LUNs, or BE-LUNs 112, while LUNs associated with higher QoS are referred to as LL-LUNs 116. Two queues are used to queue storage requests related to BE-LUNs 112 and LL-LUNs 116. Latency sensitive IO queue 120 stores storage requests for the LL-LUNs 116, and rebuild IOs for LL-LUNs to be rebuilt are placed into the latency sensitive IO queue 120 using rate-matching. Rebuild IOs for BE-LUNs are captured from the read stream (rebuild on read) and occasionally inserted in the best efforts IO queue 124. A response queue 128 stores response IOs from the LL-LUNs 116 and the BE-LUNs 112. A spare recovery module 132 may be included in a controller associated with the enclosure, and management of the rebuild for the failed drive may be managed through this module 132.

Figure 7:
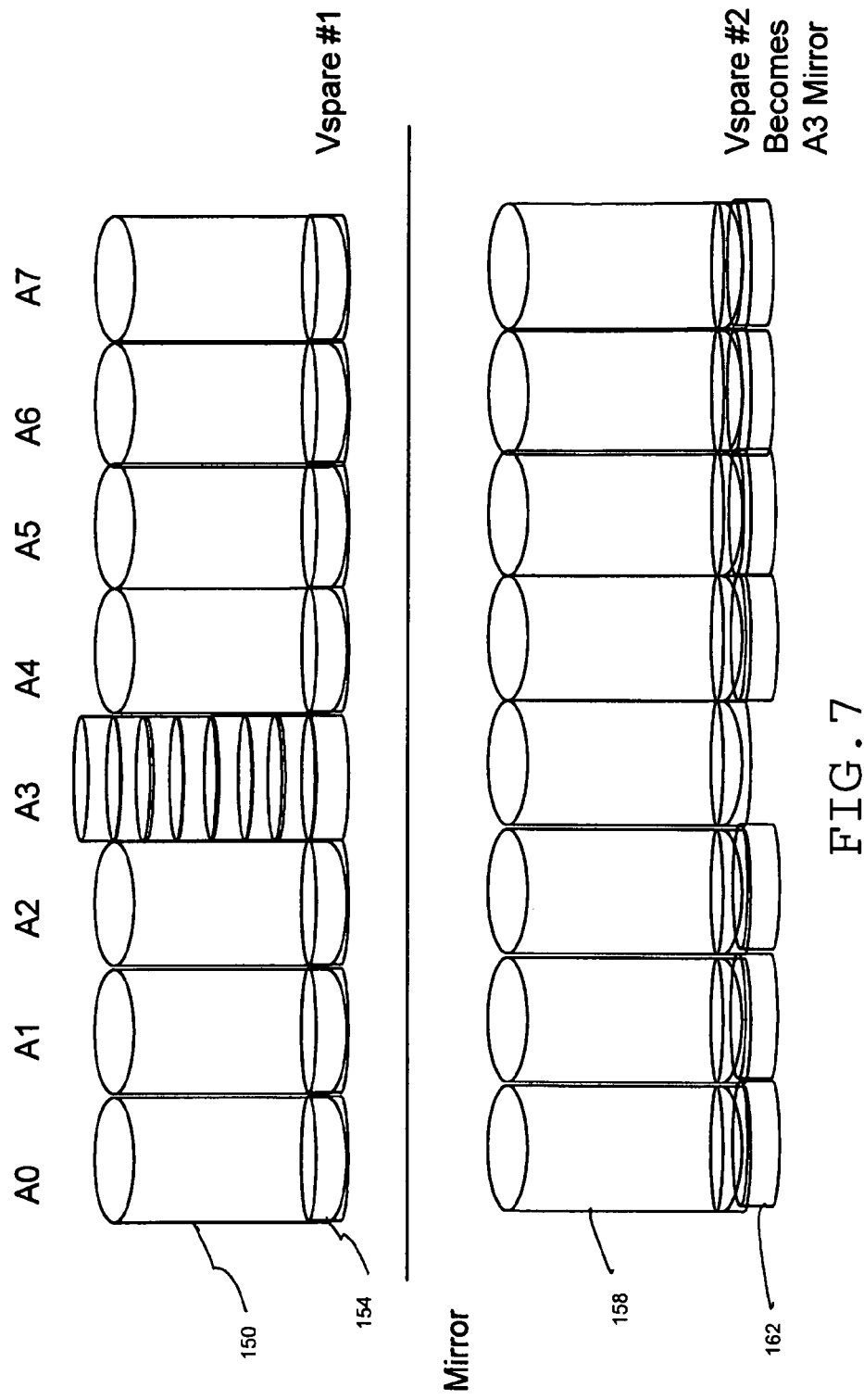
FIG. 7 is an illustration of a virtualized spare drive in an array of disk drives of an embodiment.

With reference now to FIG. 7, another exemplary embodiment is described, in which disk drives are not dedicated as active or spare drives, but rather spare capacity is virtualized across all of the drives. For example, an array of drives 150 includes eight drives, A0 through A7, and the array 150 is configured to have seven active drives and one spare drive. As illustrated in FIG. 7, this embodiment provides that all eight drives A0 through A7 are active drives, with a portion of storage of each drive allocated to a virtual spare drive 154. In this manner, storage area that corresponds to a spare drive is distributed across all of the drives A0 through A7 in the array 150. The array of drives 150 is mirrored to a mirror array 158 also containing eight drives designated A0 through A7, the mirror array 158 also having a second virtual spare drive 162. In the example of FIG. 7, drive A3 of the mirror array 158 is failed. The data from the failed drive is distributed across the second virtual spare drive 162. In such a manner, spare capacity is reserved to recover and rebuild following a drive failure while also allowing data to be distributed across all drives in the array as active drives, thereby providing a performance enhancement relative to an array with active drives and a spare drive. In one embodiment, data is stored at an array of drives using RAID-10(n), with N-way mirroring across all drives with each drive having spare regions, rather than physical spare drives.

Figure 8:
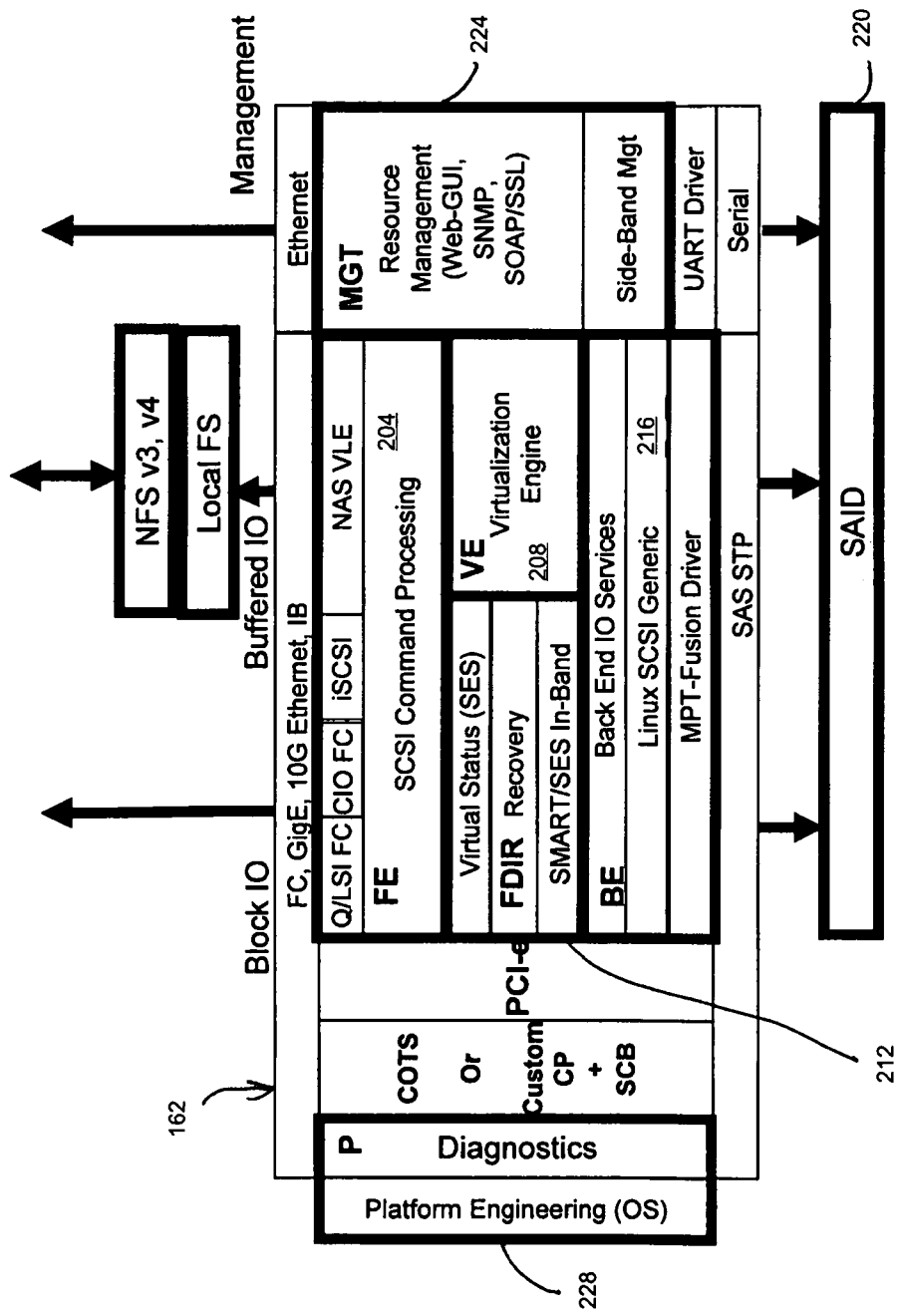
FIG. 8 is a block diagram illustration of a storage controller of an embodiment of the disclosure.

With reference now to FIG. 8, a block diagram of an architecture stack is illustrated. In this embodiment, a storage controller 200 received block IO and buffered IO into a front end 204. The IO may come into the front end using any of a number of physical transport mechanisms, including fiber channel, gigabit Ethernet, 10G Ethernet, and infiniband, to name but a few. IOs are received by the front end 204 and provided to a virtualization engine 208, and to a fault detection, isolation, and recovery (FDIR) module 212. A back end 216 is used to communicate with the SAID 220. A management interface 224 may be used to provide management functions, such as a user interface are resource management to the SAID. Finally, a diagnostics engine 228 may be used to perform testing and diagnostics for the system.

Figure 9:
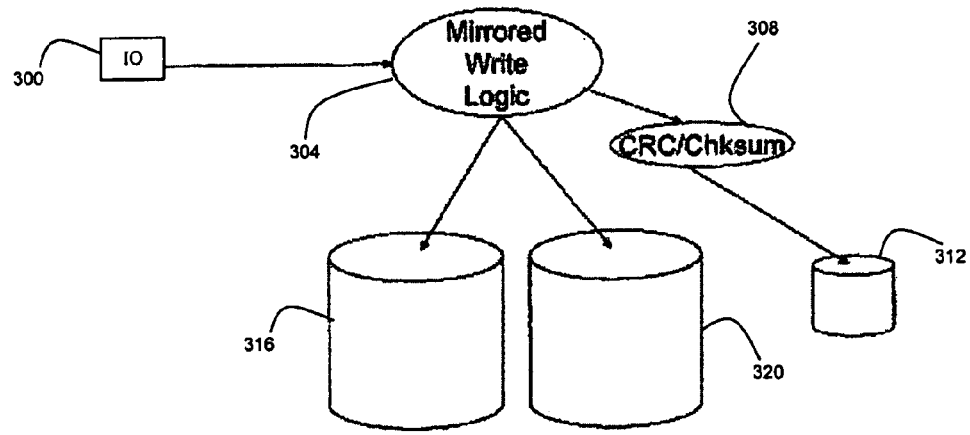
FIGS. 9 and 10 are block diagram illustration of read and write IOs for an exemplary embodiment.
Figure 10:
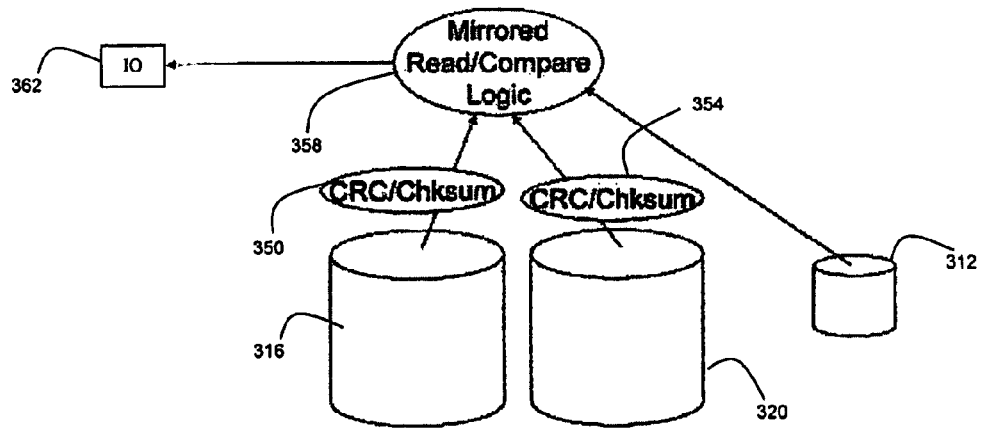

In an embodiment, data associated with IO operations is processed through error checking in the FDIR module, to identify if data is likely to include errors. In this embodiment, illustrated in FIGS. 9 and 10, CRC/checksums are computed on data for purposes of error detection. A write process is illustrated for an exemplary embodiment in FIG. 9. In this embodiment, an IO 300 is received at the front end, the IO begin a write request that includes a LBA address and data to be stored at the LBA. Mirrored write logic 304 receives the IO, and provides the data to a CRC/Checksum computation 308. In one embodiment, the CRC/checksum is a 128 bit digest of the data that is to be stored at the LBA. This checksum is provided to a checksum region 312 in the storage system. Mirrored copies of the data is provided to mirrored LUNs 316, 320, which may be virtual LUNs. A read process of an embodiment is illustrated in FIG. 10. In this embodiment, an IO is received that includes a read LBA address. The data at the LBA address is read from one of the VLUNs 316, 320, and provided to a respective CRC/checksum computation 350, 354. The value of the CRC/checksum is provided to mirrored read/compare logic 358, along with the stored checksum for the target LBA that is stored in checksum region 312. The computed checksum is compared to the stored checksum, and it is determined if the checksums match. In the event that checksums do not match, data may be read from the other mirror VLUN 316, 320, and compared to the stored checksum for the target LBA. The read LBA address and data are provided to the front end in IO 362.

Those of skill will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. If implemented in a software module, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for recovering from a fault in an array of data storage devices, comprising:

arranging the array of devices into an outside pair of device columns and an inside pair of device columns, the devices of one outside column mirroring the devices of the other outside column as mirrored outside device pairs, and the devices of one inside column mirroring the devices of the other inside column as mirrored inside device pairs;

designating a portion of the mirrored outside device pairs and a portion of the mirrored inside device pairs as spare devices;

determining that a first data storage device of the array of data storage devices is more likely to fail than other storage devices of the array of data storage devices;

selecting a first spare device, selected from the device column of which the first data storage device is a member, to be used in recovering from a failure of the first data storage device;

storing data from the first data storage device at the first spare device, and at the mirrored device of the first spare device;

in the event of a failure at the first data storage device, continuing data storage operations at the array of data storage devices using the first spare device, and the mirrored device of the first spare device;

determining that a second data storage device of the array of data storage devices is more likely to fail than the first data storage device;

selecting a second spare device, selected from the device column of which the second data storage device is a member, to be used in recovering from a failure of the second data storage device;

storing data from the second data storage device at the second spare device, and at the mirrored device of the second spare device;

in the event of a failure at the second data storage device, continuing data storage operations at the array of data storage devices using the second spare device, and the mirrored device of the second spare device;

determining that an additional data storage device of the array of data storage devices is more likely to fail than the first data storage device;

determining that no further spare data storage devices are available from the device column of which the additional data storage device is a member; and selecting an additional spare device, selected from one of the device columns not having the additional data storage device as a member, and not having a mirrored data storage device of the additional data storage device as a member, the additional spare device to be used in recovering from a failure of the additional data storage device.

2. The method, as claimed in claim 1, further comprising:
providing the first spare device as available for data storage operations prior to the first data storage device failing.

3. The method, as claimed in claim 1, further comprising:
sealing the array of devices in an enclosure, prior to said determining that a first data storage device of the array of data storage devices is more likely to fail than other storage devices of the array of data storage devices.

4. The method, as claimed in claim 1, wherein in the event of a failure of a data storage device of said array of data storage devices, the failed device is not replaced.

5. The method, as claimed in claim 1, further comprising collecting operational data from each of the data storage devices that relate to the operation of each of the data storage devices, wherein said operational data comprises at least one of power-on hours, temperature, reallocated sectors, ECC errors, and ICRC errors for the respective data storage device.

6. The method, as claimed in claim 1, wherein:
the data storage devices are disc drives comprised of rotatable actuators having rotational axes;
the rotational axes of the disc drives of one of the outside pair of columns is orthogonal to the rotational axes of the disc drives of the other of the outside pair of columns; and
the rotational axes of the disc drives of one of the inside pair of columns is orthogonal to the rotational axes of the disc drives of the other of the inside pair of columns, and parallel to the rotational axes of the disc drives of the one of the outside pair of columns.

7. The method, as claimed in claim 1, wherein:
the columns of the array of devices are subdivided into groups of rows, each of the groups of rows comprising at least a first expander in communication with a portion of one of the columns of the outside pair of device columns and a portion of one of the columns of the inside pair of device columns, and at least a second expander in communication with a portion of the other of the columns of the outside pair of device columns and a portion of the other of the columns of the inside pair of device columns; and
wherein each portion of one of the columns of the outside pair of device columns, of one of the columns of the inside pair of device columns, of the other of the columns of the outside pair of device columns, and of the other of the columns of the inside pair of device columns includes only one spare device.

8. A method for recovering from a fault in an array of data storage devices, comprising:
arranging the array of devices into an outside pair of device columns and an inside pair of device columns, the devices of one outside column mirroring the devices of the other outside column as mirrored outside device pairs, and the devices of one inside column mirroring the devices of the other inside column as mirrored inside device pairs;

designating a portion of the mirrored outside device pairs and a portion of the mirrored inside device pairs as spare devices;

collecting operational data from each of the data storage devices that relate to the operation of each of the data storage devices;

analyzing the operational data to determine that a first data storage device of the array of data storage devices is more likely to fail than other storage devices of the array of data storage devices;

selecting a first spare device, selected from the device column of which the first data storage device is a member, to be used in recovering from a failure of the first data storage device;

storing data from the first data storage device at the first spare device, and at the mirrored device of the first spare device;

in the event of a failure at the first data storage device, continuing data storage operations at the array of data storage devices using the first spare device, and the mirrored device of the first spare device;

analyzing the operational data to determine that a second data storage device of the array of data storage devices is more likely to fail than the first data storage device;

selecting a second spare device, selected from the device column of which the second data storage device is a member, to be used in recovering from a failure of the second data storage device;

storing data from the second data storage device at the second spare device, and at the mirrored device of the second spare device;

in the event of a failure at the second data storage device, continuing data storage operations at the array of data storage devices using the second spare device, and the mirrored device of the second spare device;

determining that an additional data storage device of the array of data storage devices is more likely to fail than the first data storage device;

determining that no further spare data storage devices are available from the device column of which the additional data storage device is a member; and selecting an additional spare device, selected from one of the device columns not having the additional data storage device as a member, and not having a mirrored data storage device of the additional data storage device as a member, the additional spare device to be used in recovering from a failure of the additional data storage device.

9. The method, as claimed in claim 1, wherein the selecting a first spare device is performed in a manner that minimizes vibration in the array of storage devices.

10. The method, as claimed in claim 8, wherein the selecting a first spare device is performed in a manner that minimizes vibration in the array of storage devices.

11. The method, as claimed in claim 8, further comprising:
providing the first spare device as available for data storage operations prior to the first data storage device failing.

12. The method, as claimed in claim 8, further comprising:
sealing the array of devices in an enclosure, prior to said determining that a first data storage device of the array of data storage devices is more likely to fail than other storage devices of the array of data storage devices.

13. The method, as claimed in claim 8, wherein in the event of a failure of a data storage device of said array of data storage devices, the failed device is not replaced.

14. The method, as claimed in claim 8, wherein the operational data comprises at least one of power-on hours, temperature, reallocated sectors, ECC errors, and ICRC errors for the respective data storage device.

15. The method, as claimed in claim 8, wherein:
the data storage devices are disc drives comprised of rotatable actuators having rotational axes;
the rotational axes of the disc drives of one of the outside pair of columns is orthogonal to the rotational axes of the disc drives of the other of the outside pair of columns; and
the rotational axes of the disc drives of one of the inside pair of columns is orthogonal to the rotational axes of the disc drives of the other of the inside pair of columns, and parallel to the rotational axes of the disc drives of the one of the outside pair of columns.

16. The method, as claimed in claim 8, wherein:
the columns of the array of devices are subdivided into groups of rows, each of the groups of rows comprising at least a first expander in communication with a portion of one of the columns of the outside pair of device columns and a portion of one of the columns of the inside pair of device columns, and at least a second expander in communication with a portion of the other of the columns of the outside pair of device columns and a portion of the other of the columns of the inside pair of device columns; and
wherein each portion of one of the columns of the outside pair of device columns, of one of the columns of the inside pair of device columns, of the other of the columns of the outside pair of device columns, and of the other of the columns of the inside pair of device columns includes only one spare device.

* * * * *